US012295376B2

(12) United States Patent
Veen et al.

(10) Patent No.: US 12,295,376 B2
(45) Date of Patent: May 13, 2025

(54) APPARATUS AND METHOD FOR PROCESSING POULTRY CARCASSES

(71) Applicant: Baader Poultry Holding GmbH, Lübeck (DE)

(72) Inventors: Tim Andries Veen, EM Doesburg (NL); Jacobus Zeën, EM Doesburg (NL)

(73) Assignee: Baader Poultry Holding GmbH, Lübeck (DE)

( * ) Notice: Subject to any disclaimer, the term of this patent is extended or adjusted under 35 U.S.C. 154(b) by 93 days.

(21) Appl. No.: 18/032,083

(22) PCT Filed: Oct. 19, 2020

(86) PCT No.: PCT/EP2020/079395
§ 371 (c)(1),
(2) Date: Apr. 14, 2023

(87) PCT Pub. No.: WO2022/083847
PCT Pub. Date: Apr. 28, 2022

(65) Prior Publication Data
US 2023/0404089 A1 Dec. 21, 2023

(51) Int. Cl.
*A22B 7/00* (2006.01)
*A22C 21/00* (2006.01)
*A22C 21/06* (2006.01)

(52) U.S. Cl.
CPC .......... *A22C 21/0023* (2013.01); *A22B 7/003* (2013.01); *A22C 21/0007* (2013.01); *A22C 21/0046* (2013.01); *A22C 21/0053* (2013.01)

(58) Field of Classification Search
CPC ..... A22B 7/003; A22B 7/005; A22C 21/0046; A22C 21/0053
(Continued)

(56) References Cited

U.S. PATENT DOCUMENTS 3,570,050 A * 3/1971 Draper et al. ..... A22C 21/0069
452/140
4,385,419 A 5/1983 Cantrell
(Continued)

FOREIGN PATENT DOCUMENTS

| CN | 108703203 A | 10/2018 |
| CN | 211337536 U | 8/2020 |
| EP | 0786208 A1 | 7/1997 |

*Primary Examiner* — David J Parsley
(74) *Attorney, Agent, or Firm* — DINSMORE & SHOHL LLP (57) ABSTRACT

An apparatus and method for processing poultry carcasses with a slaughter opening located between the legs includes a drivable transport conveyor for continuously conveying the carcasses, at least one holding apparatus on the transport conveyor for holding the carcasses, and a processing station. The station includes an engagement basic body rotatably mounted on a rotary axis and at least one engagement element. The engagement element is configured for at least partial engagement with the slaughter opening. During the at least partial engagement of the at least one engagement element with the carcass a widening of the slaughter opening is effected while maintaining the continuous conveyance with the generation of a torque. The engagement basic body is configured for receiving the torque. If the torque exceeds a predetermined torque, the engagement basic body is automatically released from the slaughter opening by rotation of the engagement basic body about the rotary axis.

20 Claims, 4 Drawing Sheets

(58) Field of Classification Search
USPC .................. 452/106, 177, 178, 180, 182
See application file for complete search history.

(56) References Cited

U.S. PATENT DOCUMENTS

| | | | |
|---|---|---|---|
| 5,125,513 A * | 6/1992 | Branch ................. | B07C 5/3412 |
| | | | 198/465.4 |
| 5,147,240 A * | 9/1992 | Hazenbroek ....... | A22C 21/0023 |
| | | | 452/160 |
| 5,194,035 A | 3/1993 | Dillard | |
| 5,336,127 A * | 8/1994 | Hazenbroek ....... | A22C 21/0023 |
| | | | 452/160 |
| 6,004,199 A | 12/1999 | Habenicht | |
| 6,764,393 B1 | 7/2004 | Hazenbroek | |
| 2008/0233853 A1 | 9/2008 | Higuchi | |
| 2010/0323599 A1 | 12/2010 | Hiddink | |

* cited by examiner

APPARATUS AND METHOD FOR PROCESSING POULTRY CARCASSES

CROSS-REFERENCE TO RELATED APPLICATIONS

This application is the U.S. National Stage of PCT/EP2020/079395 filed Oct. 19, 2020, the contents is incorporated herein by reference in its entirety.

FIELD OF THE INVENTION

The present invention relates to an apparatus for processing poultry carcasses or parts thereof with a slaughter opening located between the legs.

Furthermore, the invention relates to a method for processing poultry carcasses or parts thereof with a slaughter opening located between the legs.

BACKGROUND OF THE INVENTION

Such apparatuses and methods are used in the poultry processing industry to perform subsequent processing on poultry carcasses or parts thereof after slaughter—and at least partial evisceration—in order to mechanically deform or loosen areas of skin, muscle and/or bone. For this purpose, the corresponding parts of the poultry carcasses are processed during industrial processing using intervening components of the apparatus.

As part of the industrial processing of poultry, the viscera sets, which usually include the heart, liver, lungs, kidneys, gall bladder, oesophagus, gizzard, glandular stomach and intestines, are removed from the poultry carcasses via a slaughter opening, which may be the cloaca or part of the cloaca. In the context of industrial processing, further processing steps are carried out before and/or after slaughtering, which are carried out by means of different devices or device components. A particularly important aspect in the further processing of poultry is the cutting up or portioning/filleting of the slaughtered and gutted poultry, whereby, for example, the meat is separated from the carcass. When separating the meat from the carcass, complex cuts, sequences of cuts or partial cuts are regularly required to avoid damage to the carcass or areas of meat. A further difficulty in machine processing is that no damage should occur to the parts to be separated in order to meet uniform and specified quality requirements. Typically, the poultry carcasses are prepared manually or by means of apparatuses for this purpose, in order to allow a better engagement of the corresponding separating apparatuses. It is known to perform pre-cuts in different areas of the poultry prior to portioning/filleting in order to subsequently ensure a clean/precise engagement with separating means. The apparatus known in the art, by contrast, often perform these pre-cuts inaccurately or insufficiently, as a result of which the cuttings of the knives during the subsequent portioning/filleting can only engage imprecisely in the poultry carcasses, which regularly leads to damage to the sternum, in particular to the tip of the sternum in the area between the legs. Furthermore, the known apparatuses and methods for performing such pre-cuts require that the poultry carcasses are fed to the processing station in a predetermined position/posture so that the processing tools may then carry out the pre-cuts on specific cutting lines. One of the disadvantages of the processing stations is that the processing tools can only be used for uniform sizes of poultry carcasses; if there are large variations in the poultry carcasses, the use of the known processing stations leads to incorrect cuts or damage to the poultry carcasses or parts thereof. Moreover, the known processing stations only fulfil the one purpose of providing a pre-cut.

Furthermore, in the context of poultry processing, processes are desired to make the meat more durable (e.g., by chilling) or to produce more visually appealing poultry carcasses or parts thereof. For this purpose, the poultry is prepared, for example, before and/or after chilling/freezing, since in the course of chilling/freezing the end product may have a visually unappealing appearance. In addition, rigor mortis can reduce the visual appearance of poultry carcasses. During freezing or chilling, for example, the poultry carcass collapses or the poultry carcass deforms due to rigor mortis. By overstretching, which is also known under the terms stretching, widening, expanding, etc., certain areas of the poultry carcasses before and/or after chilling the poultry carcass can have a natural appearance in the subsequent intended use, i.e., the proportions or the arrangement of the anatomy of the poultry carcass has a natural appearance in the subsequent use. For this purpose, the largest muscle parts of the respective poultry carcass have to be processed, especially the pectoral muscles (breast), which is currently often done manually.

Recently, there have been increasingly higher demands on the visual appearance of food. In particular, the requirements regarding the quality and natural appearance of slaughtered products have successively increased. At the same time, there is great price pressure on producers, manufacturers and distributors of foodstuffs, which is why procedural optimisation of slaughtering processes is consequently demanded in order to reduce costs. Producers are striving to replace cost-intensive manual processing with automated equipment. Furthermore, the existing apparatuses and processes for processing poultry carcasses regularly have a high degree of complexity in the guidance and use of cutting equipment, which leads to high investment costs as well as high operating and maintenance costs. Pre-processing of poultry carcasses according to requirements can thus lead to cost savings in poultry processing. The known apparatuses and methods for processing poultry carcasses prior to subsequent cutting usually have many components and method steps as well as electronic control components, which leads to errors during the processing of the poultry carcasses. Furthermore, the processing regularly does not lead to the desired results in order to reliably carry out a subsequent cutting, for example because insufficient force is applied to the poultry carcass or if too much force causes damage to the poultry carcass or parts thereof.

A further disadvantage of the existing apparatuses for processing poultry carcasses is that they have only a narrow range of applications. For example, the apparatuses are only suitable for producing a pre-cut or only for carrying out a widening of individual extremities for subsequent cutting. A broader or different use of the known apparatuses is only possible with complex conversions, which leads to high costs in use.

Therefore, it is an object of the invention to provide an apparatus which, on the one hand, ensures reliable processing of poultry during preparation for subsequent further processing and, on the other hand, has a low degree of complexity and a wide range of applications. The object further consists in proposing a corresponding method.

SUMMARY OF THE INVENTION

This object is achieved by the apparatus mentioned hereinbefore, comprising a conveying device with a drivable transport conveyor for continuously conveying the poultry carcasses or parts thereof suspended from the legs along a transport path in the transport direction T, at least one holding apparatus arranged on the transport conveyor for holding the poultry carcasses or parts thereof by the legs during conveying along the transport path, a processing station arranged along the transport path in the region of the transport conveyor, wherein the processing station comprises an engagement basic body rotatably mounted on a rotary axis and at least one engagement element, and the at least one engagement element is configured and adapted for at least partial engagement with the slaughter opening of the poultry carcass, wherein during the at least partial engagement of the at least one engagement element with the poultry carcass or parts thereof a widening of the slaughter opening is effected while maintaining the continuous conveyance of the poultry carcass along the transport path with the generation of a torque, and the engagement basic body is configured and adapted for receiving the torque, wherein, if the torque exceeds a predetermined torque, the engagement element is automatically released from the slaughter opening by rotation of the engagement basic body about the rotary axis. The apparatus according to the invention ensures that each poultry carcass to be processed is processed reliably and essentially independently of its dimensions by the processing station, on the one hand, and that the processing is carried out using presettable parameters, on the other hand. The engagement element engages the poultry carcass in the designated area between the legs in the slaughter opening and generates by the continuous conveying a torque against the initially fixed engagement element or against the engagement base body. In this way, in particular, a widening of the relevant part of the poultry is achieved, which results in particular in a widening of the skin, the tendons or the muscle in the respective area. In particular, during engagement of the engagement element, the pectoral muscles or at least the skin or tendons between the muscle parts in this area are widened. The widening carried out enables reliable engagement with subsequent cutting tools, which in particular avoids injury to the sternum or the tip of the sternum. The predetermined torque of the engagement basic body, which automatically rotates when exceeded, ensures that only a predetermined maximum force is applied to the poultry carcass in the form of a torque, thus avoiding excessive forces, which in turn prevents damage to the poultry carcass or parts thereof. The predetermined torque can depend on different factors. The predetermined torque depends in particular on how great/extensive the expansion of the poultry carcass or the respective area of the poultry carcass (e.g., the pectoral muscles and/or the connective tissue in this area) has to be. If a less extensive expansion of the respective area is desired, for example if only skin areas are to be expanded, the torque to be applied can be selected lower, whereby a higher torque to be applied to the engagement basic body is to be selected in case of an extensive expansion. Furthermore, the torque to be exceeded can be adjusted depending in particular on the weight, the size and/or the type of poultry, whereby, generally, a lower torque is to be exceeded for smaller and lighter poultry carcasses in order to fulfil the idea of the invention, in comparison to larger and heavier poultry carcasses. The torque to be exceeded is, in principle, variable and can be individually selected depending on the application, whereby it must be at least sufficiently large in each case in order to set up an expansion on the poultry carcass or parts thereof. Preferably, the widening can also be used to arrange a destruction/detachment (separation) of (partial) areas of the poultry carcass, i.e., the slaughter opening or areas attached thereto can be torn open, whereby the structure of the poultry is changeable. Such a treatment can, for example, facilitate a downstream engagement with further (cutting) tools. The term "widening" is to be understood synonymously as expanding, stretching, tensioning, shifting etc. Whereby the term "widening" is to be understood as all optical and/or anatomical changes to the processed poultry carcass, in particular an irreversible widening of the skin and/or the musculature in the pectoral area of the poultry. The widening is generated in particular by destabilisation of existing connective tissue, whereby connective tissue comprises fatty tissue, cartilage tissue, tendons, ligaments, (blood) vessels and skin.

Preferably, a plurality of poultry carcasses are each continuously conveyed on a plurality of holding apparatuses along the transport path by the transport conveyor, for example by a conveyor chain. Therefore, the poultry carcasses can be provided manually or automatically on the holding apparatuses. The apparatus for processing the poultry carcasses can either be used as a separate apparatus or can be integrated within a more complex poultry processing process.

An expedient embodiment of the invention is characterised in that the at least one engagement element comprises at least one cutting means, configured and adapted to cut the poultry carcass or parts thereof before, during and/or after engagement of the engagement element with the slaughter opening, in particular in the region of the slaughter opening. The cutting means particularly allows the creation of a pre-cut on the poultry carcasses. Such pre-cuts serve, for example, to simplify the downstream separation/filleting of the poultry carcasses or the simplified detachment of the meat from the carcass. The pre-cut is intended, among other things, to simplify the extraction of the chicken legs or pectoral muscles, in that the areas to be cut off are easily accessible during the subsequent cutting processes. The at least one cutting means of the engagement element is preferably configured as a knife, which is arranged on the passive side of the engagement element, i.e., on the side of the engagement element facing away from the engagement with the slaughter opening. Further preferably, the at least one cutting means is not in direct contact with the slaughter opening during engagement. The cutting means preferably do not cut the poultry carcass directly during engagement of the engagement elements with the slaughter opening, but create the cut as the engagement element leaves the slaughter opening upon release of the engagement element by rotation of the engagement basic body. However, a cut can also be produced, for example, during engagement and/or during the applying torque. By configuring cutting means on the engagement element, a reliable and positionally secure pre-cut can be provided at the slaughter opening. Advantageously, the torque required to widen the poultry carcass can be reduced in this way, as widening or exposure for better handling is additionally achieved by the pre-cut. Preferably, the pre-cut comprises two cuts, which are made in both areas between the leg and the end of the pectoral muscles. The cutting "in the region of the slaughter opening" means the preparation of a cut in the immediate vicinity of the slaughter opening, in particular at the lower end of the pectoral muscles.

A preferred further development of the invention is characterised in that the predetermined torque is configured and adapted to be adjustable by a spring element being operatively connected to the engagement basic body and/or that the predetermined torque is configured and adapted to be adjustable by a drive unit being operatively connected to the rotary axis. In this way, an easy and convenient adjustability of the torque is given in order to adapt the required torque or the torque to be adjusted to the poultry carcasses to be processed. For the adjustment of the torque, further electrical, mechanical and/or control-electronic components can preferably be provided, in particular for the fully or semi-automatic adjustability of the torque. The spring element may be in particular a mechanical, hydraulic or pneumatic spring element or a combination thereof. The drive unit is, for example, a motor, in particular an electric motor, which is set against a predetermined torque and, when this torque is exceeded, is automatically transferred to a freewheeling, causing the engagement basic body to rotate about the rotary axis. Further preferably, the drive unit may comprise at least one gear for increasing the range of use. In a particular embodiment, the drive unit can also comprise purely mechanical components, whereby the adjustable torque is configured to be adjustable with these.

According to a further preferred embodiment of the invention, the drive unit comprises an actuator, configured and adapted for setting a predefined profile of the predetermined torque and for releasing the engagement base body. In this way, there is a convenient option for setting the required torque as desired, i.e., depending on the poultry carcasses to be processed. Furthermore, the actuator enables monitoring of the torque and an on-demand adjustment of the torque, for example during the processing procedure. Preferably, the actuator is designed as a servomotor.

An advantageous embodiment of the invention is characterised in that the engagement basic body comprises a cam disc, the cam disc being operatively connected to the spring element and being configured to enable a rotation of the engagement basic body about the rotary axis when the predetermined torque on the engagement element is exceeded. The combination of the cam disc with the spring element provides a possibility with a low degree of complexity to establish a reliable setting and changeability of the torque as well as to control the course of the disengagement. For example, the cam disc as well as the spring element can be adapted according to the requirements of the torque. When the torque is exceeded, which is specified in the design of the spring element and the design of the cam disc, the engagement basic body is released. The spring element preferably comprises a scanner for engaging with the cam disc. The scanner is preferably in direct contact with the cam disc and serves to transmit force between the cam disc and the spring element. When the predetermined torque is exceeded, the spring element is compressed and the scanner moves in or on the cam disc. The scanner comprises, for example, an impeller that can be guided on the circumference of the cam disc. The geometry of the cam disc preferably comprises recesses/notches and elevations/rises/inclines which are configured and adapted for adjusting the release of the engagement basic body, i.e., for controlling the course of the release as well as for terminating the rotation.

A preferred further embodiment of the invention is characterised in that the cam disc contains at least one circumferential control cam which controls the rotation of the engagement basic body by the spring element when the engagement element engages with the slaughter opening, wherein the at least one circumferential control cam is configured to terminate the automatic rotation of the engagement basic body about the rotary axis after the engagement element is released from the slaughter opening of the poultry carcass. With the circumferential control cam, the rotation of the engagement basic body can be prevented upon release in that at least one area exists which provides the engagement basic body with a new rest position and whereby further release of the engagement basic body does not occur until the torque is exceeded again. The at least one area of the cam disc or the circumferential control cam is configured, for example, by at least one recess/notch and by at least one elevation/rise/incline adjacent thereto, i.e., by at least one radius of the cam disc which is reduced in an area and a radius of the cam disc which is increased in an area.

A preferred embodiment is characterised in that the engagement element comprises a hook-shaped engagement portion, wherein the hook-shaped engagement portion is configured and adapted for at least partial engagement with the slaughter opening. The hook-shaped engagement portion provides a reliable and guidable engagement of the engagement element with the slaughter opening, while at the same time the hook-shaped contour prevents a too long engagement with the slaughter opening by allowing an automatic release of the hook-shaped engagement portion upon rotation about the rotary axis. The hook-shaped engagement portion can be adapted in its length and its width individually to the poultry areas to be expanded. Preferably, the engagement element, or at least the engagement portion, is configured to be interchangeable. The hook-shaped engagement portion can have receptacles for further means, for example to attach and/or replace cutting means or engagement portions with larger dimensions.

A preferred further embodiment of the invention is characterised in that the processing station comprises a guide section for guiding and/or aligning the poultry carcasses, wherein the guide section is arranged upstream of the at least one engagement element. The guide section enables the poultry carcass to be guided in a controlled manner in order to ensure reliable engagement with the engagement element. In addition, the guide section can act as a counter-bearing element during engagement, for example to prevent slipping of the poultry carcass. Further preferably, the guide section comprises at least one further guide element configured to receive or guide at least one of the extremities of the poultry carcass. Particularly preferably, the guide section is configured with a slope/inclination in the course of the transport direction T in order to allow the poultry carcass to be positioned thereon and whereby the slaughter opening is made accessible for the engagement element. The guide section is particularly preferably configured as a slide comprising a recess; the guide element preferably comprises rail elements for guiding the wings and/or the legs.

In a further advantageous embodiment of the invention, a weighing device for determining the weight of the poultry carcasses is arranged upstream of the processing station, and the weighing device is configured and adapted to automatically set the predetermined torque according to the determined weight. In this way, fully automatic operation of the apparatus is ensured without having to adjust the torque manually or mechanically. In addition, the weighing device preferably comprises a computer and/or control unit for calculating and setting the torque according to the weight of the poultry carcasses. Preferably, the determined data of the weighing device can be made available for further processing steps, for example for sorting or classifying steps.

A further expedient embodiment of the invention is characterised in that the engagement basic body is configured and adapted to be substantially rotationally symmetrical, wherein a plurality of engagement elements are arranged on the circumference of the engagement basic body, in particular three to nine engagement elements. Particularly preferably, the engagement basic body comprises five engagement elements. In this way, a configuration with high efficiency and at the same time compact construction and the possibility of continuous use of the apparatus for the processing of poultry carcasses is provided.

In a further advantageous embodiment of the invention, the slaughter opening of the poultry carcass is located in the region of the cloaca. In a preferred embodiment, depending on the type of poultry, the slaughter opening, i.e., the engagement opening for the engagement element, can be present in different regions of the poultry carcass, for example, if different regions of the poultry are to be expanded by means of the processing station.

Furthermore, the object is solved by the method mentioned hereinbefore comprising the following steps: continuously conveying the poultry carcasses or parts thereof to be processed by a conveying device along a transport path in the transport direction T, holding the poultry carcasses or parts thereof by the legs during conveying along the transport path by at least one holding apparatus arranged on the transport conveyor, guiding the poultry carcasses into a processing station arranged along the transport path in the region of the transport conveyor, at least partial engagement of an engagement element rotatably mounted on a rotary axis and arranged on an engagement basic body of the processing station with the slaughter opening of the poultry carcass, widening the slaughter opening while generating a torque during the at least partial engagement of the at least one engagement element with the poultry carcass or parts thereof, while maintaining continuous conveying, and automatically releasing the engagement element from the slaughter opening by rotation of the engagement basic body about the rotary axis when a predetermined torque on the at least one engagement element is exceeded. In this way, a reliable widening in the region of the slaughter opening is provided, in particular the pectoral muscles or parts thereof, the adjacent skin and/or connective tissue regions and/or the sternum with the adjacent bone parts are widened. Preferably, the slaughter opening is enlarged during this process and the position of the legs is changed.

In order to avoid repetition, reference will be made in connection with the method according to the invention to the advantages already outlined in detail in connection with the apparatus according to the invention. These apply analogously also to the method according to the invention.

An expedient embodiment of the invention is characterised by adjusting the circular knives synchronously and/or substantially orthogonally to the transport path by the control unit.

A preferred further embodiment of the invention is characterised by cutting into the poultry carcass or parts thereof, in particular in the region of the slaughter opening, before, during and/or after engagement of the engagement element with the slaughter opening by a cutting means arranged on the engagement element.

An advantageous further embodiment of the invention is characterised by adjusting the predetermined torque by a spring element operatively connected to the engagement basic body and/or by a drive unit operatively connected to the rotary axis.

A preferred further embodiment of the invention is characterised by setting a predefined course of the predetermined torque and releasing the engagement base body by means of an actuator comprising the drive unit.

A further advantageous embodiment of the invention is characterised by arranging a rotation of the engagement element about the rotary axis by a cam disc of the engagement basic body when the predetermined torque is exceeded on the engagement element, wherein the cam disc is operatively connected to the spring element.

An expedient embodiment of the invention is characterised by controlling the rotation of the engagement basic body by at least one circumferential control cam of the cam disc by the spring element upon engagement of the engagement element with the slaughter opening, wherein the automatic rotation of the engagement basic body about the rotary axis is terminated by the circumferential control cam after the engagement element is released from the slaughter opening of the poultry carcass.

A preferred further embodiment of the invention is characterised by partially engaging a hook-shaped engagement portion of the engagement element with the slaughter opening.

A further advantageous embodiment of the invention is characterised by guiding and/or aligning the poultry carcasses through a guide section of the processing station, wherein the guide section is arranged upstream of the at least one engagement element.

An expedient embodiment of the invention is characterised by determining the weight of the poultry carcasses by a weighing device arranged upstream of the processing station to automatically set the predetermined torque by the weighing device according to the determined weight.

Particularly preferably, the method is carried out with an apparatus as disclosed herein.

The advantages and effects arising therefrom have already been described in connection with the apparatus so that, in order to avoid repetition, reference is made to the preceding passages.

BRIEF DESCRIPTION OF THE DRAWINGS

Further expedient and/or advantageous features, embodiments and developments of the invention will become apparent from the description. Particularly preferred embodiments of the apparatus and the method will be explained in greater detail with reference to the accompanying drawings. The drawings show.

and

DETAILED DESCRIPTION OF THE INVENTION

The apparatus according to the invention and the method according to the invention are described in more detail with reference to the above-mentioned figures. In order to avoid repetition, the statements made in relation to the apparatus also apply to the method according to the invention, so that statements are made hereinbelow only on selected aspects of the method according to the invention, isolated from the apparatus according to the invention.

The apparatus shown in the drawings is configured and adapted for processing poultry carcasses. In particular, the apparatus is configured and adapted for processing chickens. The invention relates in the same way to comparable poultry species or animal species in which a slaughter opening is to be widened with the apparatus according to the invention and/or with the method according to the invention. Furthermore, the apparatus and method is configured and adapted for widening and stretching skin and connective tissue areas of poultry carcasses as well as the sternum and bone parts adjacent thereto. The invention also equally relates to the widening of openings which have not (only) resulted from slaughtering, but are already present, for example, due to the anatomy of the corresponding poultry/animal.

The apparatus 10 shown is configured and adapted for processing poultry carcasses 11 or parts thereof with a slaughter opening 13 located between the legs 12, comprising a conveying device 14 with a drivable transport conveyor 15 for continuously conveying, suspended from the legs 12, the poultry carcasses 11 or parts thereof to be processed (see FIG. 1 and FIG. 3) along a transport path 16 in the transport direction T. A holding apparatus 17 for holding the poultry carcasses 11 or parts thereof by the legs 12 during conveying along the transport path 16 is arranged on the at least one transport conveyor 15. Along the conveying device 14, in the region of the transport conveyor 15, a processing station 18 (see in detail FIG. 2 and FIG. 4) is arranged, wherein the processing station 18 comprises an engagement basic body 20 rotatably mounted on a rotary axis 19 with at least one engagement element 21. The at least one engagement element 21 is configured and adapted for at least partial engagement with the slaughter opening 13 of the poultry carcass 11, wherein during the at least partial engagement of the at least one engagement element 21 with the poultry carcass 11 or parts thereof a widening of the slaughter opening 13 and/or a stretching of the sternum—not shown in detail in the figures—is effected while maintaining the continuous conveyance of the poultry carcass 11 along the transport path 16 with the generation of a torque, and the engagement basic body 20 is configured and adapted for receiving the torque, wherein, if the torque exceeds a predetermined torque, the engagement element 21 is automatically released from the slaughter opening 13 by rotation R of the engagement basic body 20 about the rotary axis 19.

The apparatus 10 according to the invention is generally integrated into a processing line—not shown in the figures—with various other apparatuses, in which poultry are slaughtered and further processed with the highest possible degree of automation.

The features and further embodiments described below constitute preferred embodiments, considered individually or in combination with each other. It is expressly pointed out that features which are summarised in the description and/or in the drawing, or which are described in a common embodiment, can also functionally constitute the apparatus 10 described further above in an independent manner.

Figure 1:
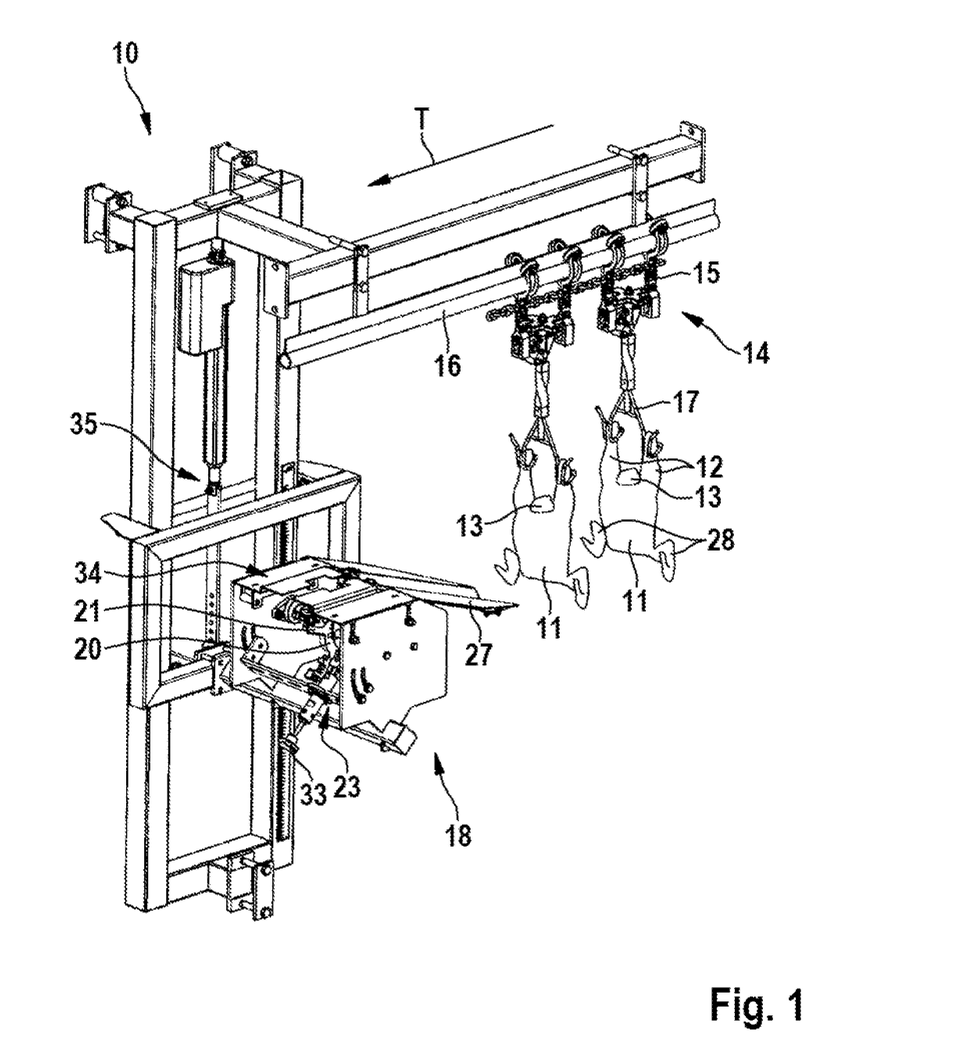
FIG. 1 a schematic illustration of an apparatus according to the invention in a perspective view from diagonally above with poultry carcasses hanging by the legs.
Figure 3:
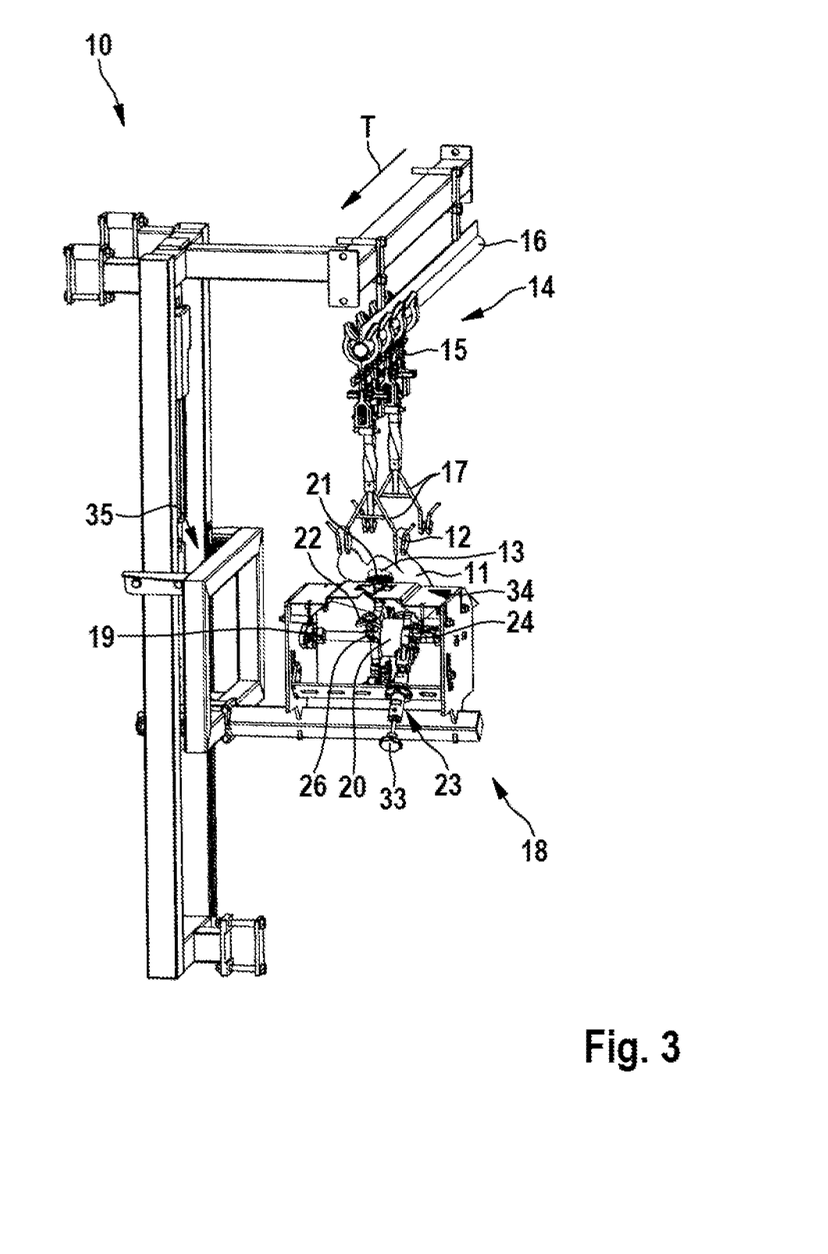
FIG. 3 a perspective view of the apparatus according to the invention of FIG. 1 in a view from the front in the course of the transport direction during the processing of a poultry carcass.
Figure 4:
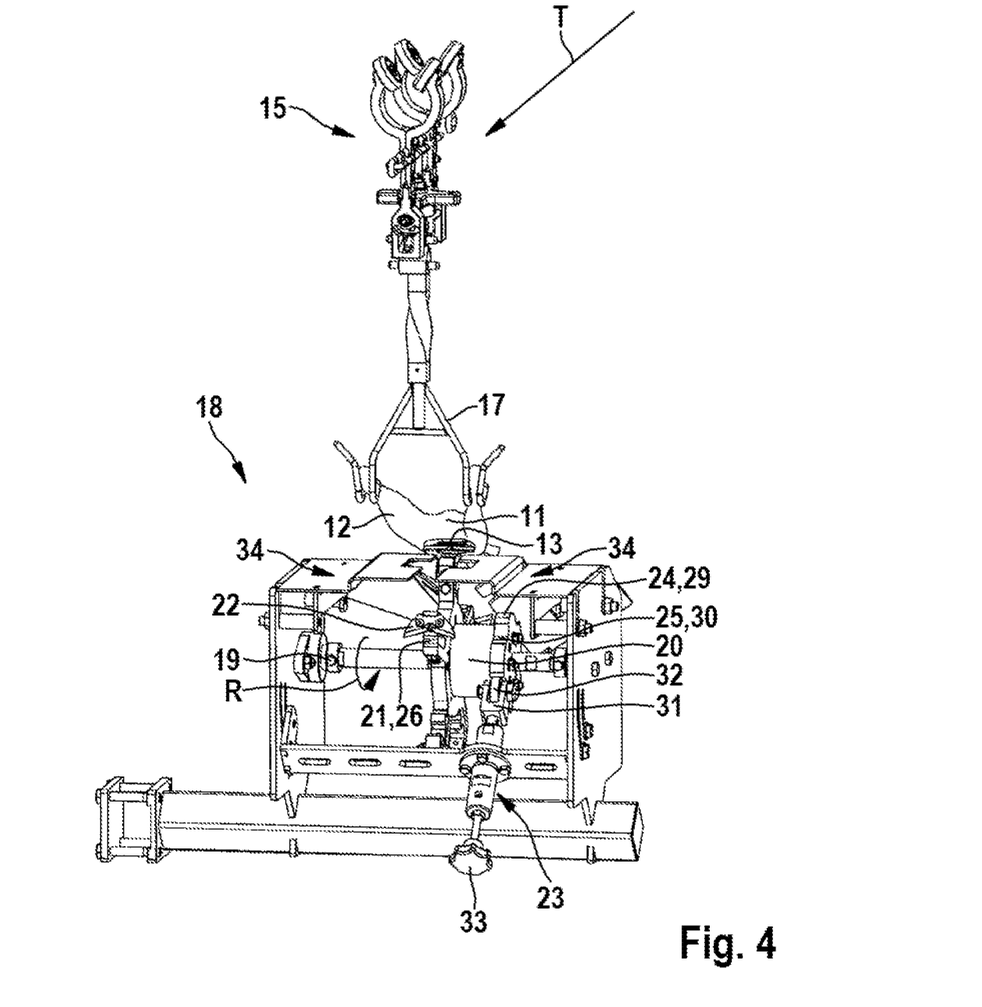
FIG. 4 the processing station of FIG. 2 in a view from the front in the course of the transport direction during the processing of a poultry carcass.

In order to provide a better understanding of the invention, the anatomy of the poultry carcasses 11 or parts thereof to be processed by means of the invention is first described. In FIG. 1, FIG. 3 and FIG. 4, poultry carcasses 11 are shown schematically and simplified. The poultry carcasses 11 generally still possess all extremities, i.e., both legs 12 and both wings 28, when transported on the conveyor 14. After being processed by the processing station 18, the poultry carcasses 11 may subsequently be further processed, i.e., cut up or portioned. Preferably, the at least partially expanded poultry carcass 11 may also already constitute the final end product.

For the poultry carcasses 11 to be processed by the apparatus 10, the slaughter opening 13 is located between the legs 12, in particular in the area of the cloaca, or the slaughter opening 13 may be at least partially defined by the cloaca. The slaughter opening 13 is created during industrial poultry processing by removing the viscera—not shown in the figures—therefrom. Alternatively or additionally, other areas or openings in poultry carcasses can be widened/stretched by the apparatus according to the invention, as for example the sternum.

In FIG. 1, FIG. 3 and FIG. 4, poultry carcasses 11 are shown in stylised form, arranged with the legs 12 hanging on holding apparatuses 17 and conveyed by the conveyor 14. In the course of the transport direction T, the poultry carcasses 11 are fed by the transport conveyor 15 to the processing station 18 or brought into engagement with the processing station 18, which is shown in detail in FIG. 4 during the engagement of an engagement element 21 with a poultry carcass 11. The processing station 18 may be positionable at different heights on the apparatus 10, for example to process different types of poultry in the same manner. For this purpose, the apparatus 10 comprises a height and/or side adjustment device 35, for example a toothed rack or the like, for adjusting the processing station 18 thereon in a height-adjustable and/or side-adjustable manner. Such a height and/or side adjustment of the processing station 18 can furthermore be controlled electronically and/or automatically in order to have a direct influence on the poultry carcasses 11 to be processed.

Preferably, the at least one engagement element 21 comprises at least one cutting means 22, configured and adapted to cut the poultry carcass 11 or parts thereof before, during and/or after the engagement of the engagement element 21 with the slaughter opening 13, in particular in the area of the slaughter opening 13. FIG. 3 and FIG. 4 show the engagement of the engagement element 21 with the slaughter opening 13, wherein a cutting of the slaughter opening 13 with the cutting means 22 is established. During the cutting of the cutting means 22, a torque also applies to the poultry carcass 11 or the torque is transmitted through the poultry carcass 11 to the engagement basic body 20 via the engagement element 21. When a predetermined torque is exceeded, also in the case of engagement elements 21 with cutting means 22, the slaughter opening 13 is widened and the engagement basic body 20 is released by rotation R about the rotary axis 19. Depending on the arrangement of the cutting means 22, the incision may occur before and/or during the engagement of the engagement element 21 with the slaughter opening 13 and/or may only occur when the engagement element 21 leaves the slaughter opening 13, in that the cutting means 22 thereby engages the corresponding regions.

Preferably, the predetermined torque is configured and adapted to be adjustable by a spring element 23 (see FIG. 1 to FIG. 4) which is operatively connected to the engagement basic body 20 and/or the predetermined torque is configured and adapted to be adjustable by a drive unit—not shown in the figures—which is operatively connected to the rotary axis 19. The drive unit preferably drives the rotary axis directly or via drive means. For this purpose, the drive unit can further preferably comprise an actuator, configured and adapted for setting a defined profile of the predetermined torque and for releasing the engagement basic body 20.

Figure 2:
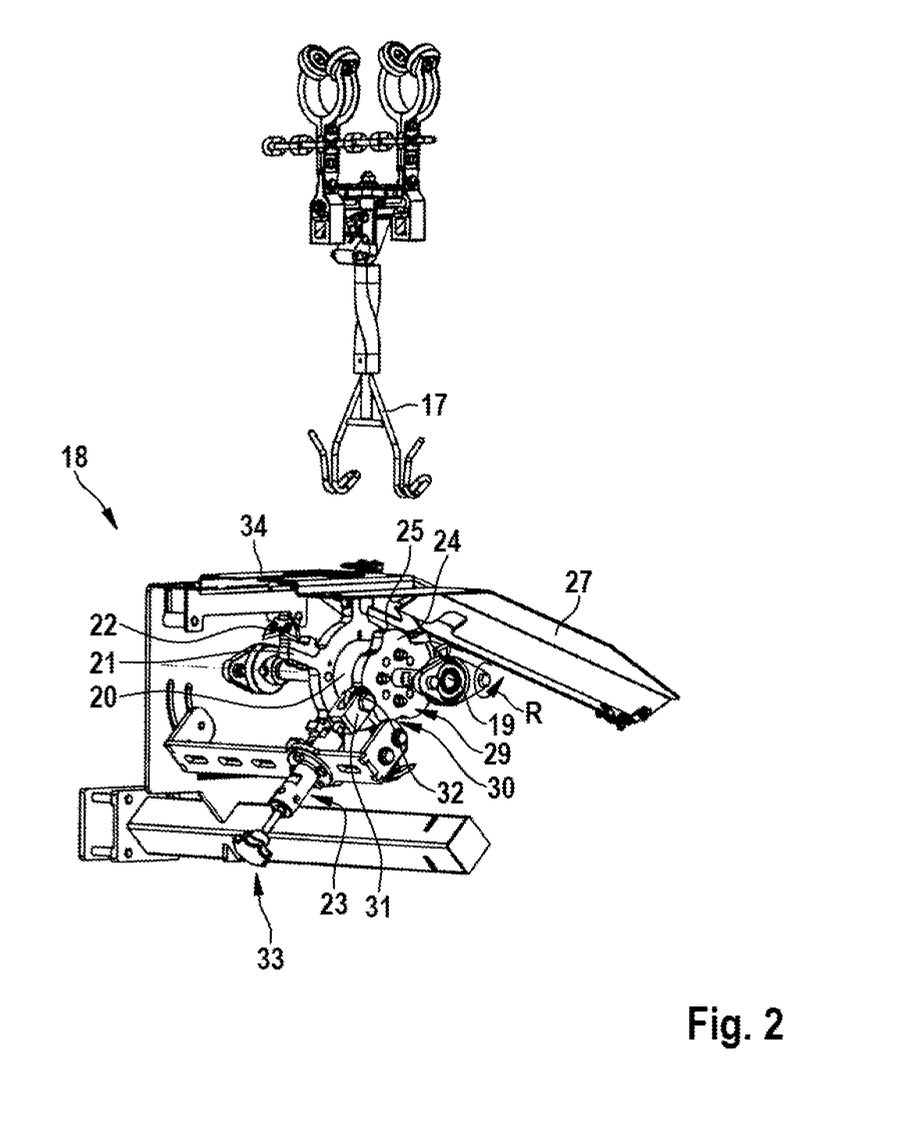
FIG. 2 a detailed side view of a processing station according to the invention with a section of a transport conveyor.

The engagement basic body 20 preferably comprises a cam disc 24, which is shown in detail in particular in FIG. 2 and in FIG. 4. The cam disc 24 is operatively connected to the spring element 23 and is configured to release a rotation R of the engagement basic body 20 about the rotary axis 19 when the predetermined torque on the engagement element 21 is exceeded. The exceeding of the torque arises from the continuous conveying of the poultry carcasses 11 along the transport path 16. When the slaughter opening 13 is engaged with the at least one engagement element 21, an engagement torque arises in each case due to the ability of the engagement basic body 20 to absorb a predetermined torque, wherein the spring element 23 preferably provides the predetermined torque in conjunction with the cam disc 24. If the predetermined torque is exceeded by the engagement torque, release is effected on the basis of the maximal predetermined torque of the spring element 23 by rotation of the engagement basic body 20 about the rotary axis 19. If the predetermined torque is exceeded by the engagement torque, release of the spring element 23 is effected by the cam disc, i.e. for example compression, which releases the rotation R about the rotary axis 19. The predetermined torque is further preferably variable via an adjusting element 33 that can control the spring force of the spring element 23.

The cam disc 24 contains at least one circumferential control cam 25 which controls the rotation R of the engagement basic body 20 by the spring element 23 when the engagement element 21 engages with the slaughter opening 13, wherein the at least one circumferential control cam 25 is configured to terminate the automatic rotation R of the engagement basic body 20 about the rotary axis 19 after the engagement element 21 is released from the slaughter opening 13 of the poultry carcass 11. For this purpose, the cam disc has, for example, at least one elevation 29 or at least one recess 30, whereby a predetermined rotation R is set up. The spring element 23 preferably comprises a scanner 31 with an impeller 32, which cooperate with the cam disc 24 or with the circumferential control cam 25, i.e., are guided thereon. When the scanner 31 with the impeller 32 is positioned from the elevation 29 into the recess 30, the rotation R about the rotary axis 19 is terminated.

The engagement element 21 preferably comprises a hook-shaped engagement portion 26, wherein the hook-shaped engagement portion 26 is configured and adapted for at least partial engagement with the slaughter opening 13. The hook-shaped engagement portion 26 is particularly suitable for releasable engagement with the slaughter opening 13 due to the hook shape.

FIG. 1 and FIG. 2 show that the processing station 18 comprises a guide section 27 for guiding and/or aligning the poultry carcasses 11, wherein the guide section 27 is arranged upstream of the at least one engagement element 21. As shown in FIG. 3 and FIG. 4, the guide section 27 allows the poultry carcasses 11 to be brought into an inclined position for subsequent engagement with the engagement elements 21, whereby a targeted engagement of the engagement element 21 with the poultry carcass 11 is provided. The poultry carcasses 11 are more independent of height on the transport conveyor 15 due to the guide section 27, clearing the slaughter opening 13 for precise engagement.

Preferably, a—in the figures not shown—weighing device for determining the weight of the poultry carcasses 11 is arranged upstream of the processing station 18, and the weighing device is further preferably configured and adapted to automatically set the predetermined torque according to the determined weight. For this purpose, regularly further mechanical, electronic and/or electrical components as well as at least one computer unit are provided in order to set an automatic adjustment of the torque or of the spring element 23 or of the drive unit.

Advantageously, the engagement basic body 20 is configured and adapted to be substantially rotationally symmetrical, wherein a plurality of engagement elements 21 are arranged on the circumference of the engagement basic body 20, in particular three to nine engagement elements 21. In the embodiments of FIG. 1 to FIG. 4, five engagement elements 21 are arranged on the engagement basic body 20 in each case. The cam disc 24 is in each case configured analogously to the engagement basic body 20, in order to set up a corresponding release of the engagement basic body 20 by rotation R about the rotary axis 19. The processing station 18 according to the invention enables continuous processing due to the rotationally symmetrical design of the engagement basic body 20. After the executed rotation R about the rotary axis 19, there is an engagement element 21 ready in each case to engage with a slaughter opening 13 of a poultry carcass 11. As shown in FIG. 1 to FIG. 4, in the area of engagement of the engagement element 21 with the slaughter opening 13 of the poultry carcass, protective elements 34 (e.g. metal sheets) can be provided, whereby e.g. undesired contact with the further areas of the engagement basic body 20 is prevented. The protective elements 34 expose an opening in which the engagement elements 21 are rotatable.

The invention claimed is:

1. An apparatus configured and adapted for processing poultry carcasses or parts thereof with a slaughter opening located between the legs, comprising:
   a conveying device with a drivable transport conveyor for continuously conveying the poultry carcasses to be processed or parts thereof suspended by the legs along a transport path in the transport direction, and at least one holding apparatus arranged on the transport conveyor for holding the poultry carcasses or parts thereof by the legs during conveying along the transport path;
   a processing station arranged along the transport path in the region of the transport conveyor, wherein the processing station comprises a rotatable engagement basic body mounted on a rotary axis, wherein the rotary axis extends through the processing station, at least one engagement element, and the at least one engagement element is configured and adapted for at least partial coupling with the slaughter opening of the poultry carcasses;
   wherein during the at least partial coupling of the at least one engagement element with the poultry carcass or parts thereof a widening of the slaughter opening is effected while maintaining the continuous conveyance of the poultry carcass along the transport path with the generation of a torque, and the engagement basic body is configured and adapted for receiving the torque;
   wherein, when the torque received by the engagement element exceeds a predetermined torque, the engagement element is automatically released from the slaughter opening by rotation of the engagement basic body about the rotary axis.

2. The apparatus according to claim 1, wherein the at least one engagement element comprises at least one cutting means configured and adapted to cut into the poultry carcass or parts thereof before, during and/or after coupling of the engagement element with the slaughter opening.

3. The apparatus according to claim 1, wherein:
   the predetermined torque is configured and adapted to be adjustable by a spring element being operatively connected to the engagement basic body; and/or
   the predetermined torque is configured and adapted to be adjustable by a drive unit being operatively connected to the rotary axis.

4. The apparatus according to claim 3, wherein the drive unit comprises an actuator, configured and adapted for setting a predefined course of the predetermined torque and for releasing the engagement basic body.

5. The apparatus according to claim 3, wherein the engagement basic body comprises a cam disc, the cam disc being operatively connected to the spring element and being configured to enable a rotation of the engagement basic body about the rotary axis when the predetermined torque on the engagement element is exceeded.

6. The apparatus according to claim 5, wherein:
the cam disc contains at least one circumferential control cam which controls the rotation of the engagement basic body by the spring element when the engagement element engages with the slaughter opening; and
the at least one circumferential control cam is configured to terminate the automatic rotation of the engagement basic body about the rotary axis after the engagement element is released from the slaughter opening of the poultry carcass.

7. The apparatus according to claim 1, wherein:
the engagement element comprises a hook-shaped engagement portion; and
the hook-shaped engagement portion is configured and adapted for at least partial engagement with the slaughter opening.

8. The apparatus according to claim 1, wherein:
the processing station comprises a guide section for guiding and/or aligning the poultry carcasses; and
the guide section is arranged upstream of the at least one engagement element.

9. The apparatus according to claim 1, further comprising a weighing device for determining a weight of the poultry carcasses arranged upstream of the processing station, and the weighing device is configured and adapted to automatically set the predetermined torque according to the determined weight.

10. The apparatus according to claim 1, wherein:
the engagement basic body is configured and adapted to be substantially rotationally symmetrical; and
a plurality of engagement elements are arranged on a circumference of the engagement basic body.

11. The apparatus according to claim 1, wherein the slaughter opening of the poultry carcasses is located in the region of the cloaca.

12. A method for processing poultry carcasses or parts thereof with a slaughter opening located between the legs, comprising the steps:
continuously conveying the poultry carcasses or parts thereof to be processed by a conveying device along a transport path in the transport direction;
holding the poultry carcasses or parts thereof by the legs during conveying along the transport path by at least one holding apparatus arranged on the transport conveyor;
guiding the poultry carcasses into a processing station arranged along the transport path in the region of the transport conveyor;
at least partial coupling of a rotatable engagement element mounted on a rotary axis, wherein the rotary axis extends through the processing station, and wherein the rotatable engagement element and the rotary axis are arranged on an engagement basic body of the processing station with the slaughter opening of the poultry carcass;
widening the slaughter opening while generating a torque during the at least partial engagement of the at least one engagement element with the poultry carcass or parts thereof, while maintaining continuous conveying; and
automatically releasing the engagement element from the slaughter opening by rotation of the engagement basic body about the rotary axis when a predetermined torque on the at least one engagement element is exceeded.

13. The method according to claim 12, further comprising cutting into the poultry carcass or parts thereof.

14. The method according to claim 12, further comprising adjusting the predetermined torque by a spring element operatively connected to the engagement basic body and/or by a drive unit operatively connected to the rotary axis.

15. The method according to claim 14, further comprising setting a predefined course of the predetermined torque and releasing the engagement basic body by an actuator comprising the drive unit.

16. The method according to claim 14, further comprising arranging a rotation of the engagement element about the rotary axis by a cam disc of the engagement basic body when the predetermined torque is exceeded on the engagement element, wherein the cam disc is operatively connected to the spring element.

17. The method according to claim 16, further comprising controlling the rotation of the engagement basic body by at least one circumferential control cam of the cam disc by the spring element upon engagement of the engagement element with the slaughter opening, wherein the automatic rotation of the engagement basic body about the rotary axis is terminated by the circumferential control cam after the engagement element is released from the slaughter opening of the poultry carcass.

18. The method according to claim 12, further comprising partially engaging a hook-shaped engagement portion of the engagement element with the slaughter opening.

19. The method according to claim 12, further comprising guiding and/or aligning the poultry carcasses through a guide section of the processing station, wherein the guide section is arranged upstream of the at least one engagement element.

20. The method according to claim 12, further comprising determining a weight of the poultry carcasses by a weighing device arranged upstream of the processing station to automatically set the predetermined torque by the weighing device according to the determined weight.

* * * * *